United States Patent
Khurana et al.

(10) Patent No.: US 9,838,992 B2
(45) Date of Patent: Dec. 5, 2017

(54) PROVIDING HOSPITALITY VIA A MOBILE DEVICE

(71) Applicant: Honeywell International Inc., Morristown, NJ (US)

(72) Inventors: Himanshu Khurana, Plymouth, MN (US); Datta Godbole, Plymouth, MN (US); Heather Lister, Morristown, NJ (US); Patrick Tessier, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/575,183

(22) Filed: Dec. 18, 2014

(65) Prior Publication Data

US 2016/0182703 A1    Jun. 23, 2016

(51) Int. Cl.
| | |
|---|---|
| *H04W 12/06* | (2009.01) |
| *H04W 64/00* | (2009.01) |
| *H04W 4/02* | (2009.01) |
| *H04M 1/725* | (2006.01) |

(52) U.S. Cl.
CPC ......... *H04W 64/00* (2013.01); *H04M 1/7253* (2013.01); *H04M 1/72572* (2013.01); *H04W 4/023* (2013.01)

(58) Field of Classification Search
CPC ................................ H04W 12/06; H04N 7/18
USPC ........................................................ 455/420
See application file for complete search history.

(56) References Cited

U.S. PATENT DOCUMENTS

| | | | |
|---|---|---|---|
| 8,136,738 B1* | 3/2012 | Kopp | F24F 11/0034 165/237 |
| 2008/0215441 A1* | 9/2008 | Bruggemeier | G06Q 30/02 705/14.25 |
| 2011/0302607 A1* | 12/2011 | Warrick | H04L 12/2809 725/39 |
| 2011/0314502 A1* | 12/2011 | Levy | H04N 7/106 725/46 |
| 2015/0120000 A1* | 4/2015 | Coffey | H04L 12/2803 700/13 |
| 2015/0199863 A1* | 7/2015 | Scoggins | G07C 9/00904 340/5.25 |

* cited by examiner

*Primary Examiner* — Michael Neff
(74) *Attorney, Agent, or Firm* — Brooks, Cameron & Huebsch, PLLC

(57) ABSTRACT

Providing hospitality via a mobile device is described herein. One method includes determining, by a mobile device, a hospitality preference of a user of the mobile device for a particular location, storing the hospitality preference in a memory of the mobile device, and modifying, by the mobile device, an operation of at least one system device associated with the particular location to provide the hospitality preference responsive to a distance between the mobile device and the particular location exceeding a particular threshold.

17 Claims, 2 Drawing Sheets

PROVIDING HOSPITALITY VIA A MOBILE DEVICE

TECHNICAL FIELD

The present disclosure relates to providing hospitality via a mobile device.

BACKGROUND

Users who are traveling may desire hospitality. In some instances, hospitality can include comfort, ease of use, streamlined travel, and/or information, among others. Hospitality may be provided by an entity (e.g., a business, service, etc.). An entity can employ devices designed to provide hospitality. In some examples, devices can be located in structures (e.g., homes, hotels, motels, airports, office buildings, etc.) or in vehicles (e.g., automobiles, trains, ships, etc.). These devices can, for example, provide access and/or security, control temperature, lighting, ventilation, and/or humidity, among others. Providing hospitality can include providing a way for users to interact with these devices.

DETAILED DESCRIPTION

Figure 1:
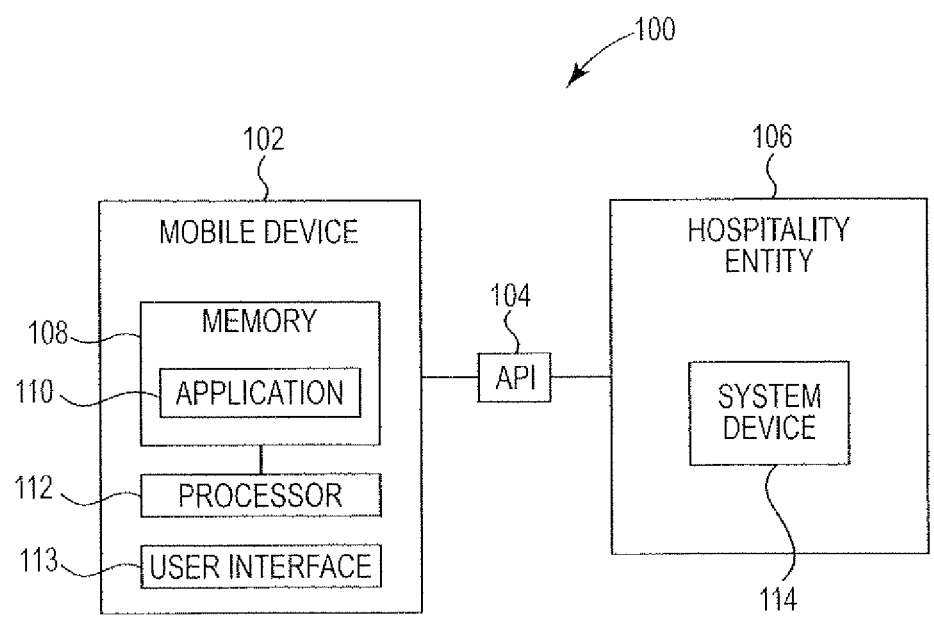
FIG. 1 illustrates a system for providing hospitality via a mobile device accordance with one or more embodiments of the present disclosure.

Providing hospitality via a mobile device is described herein. For example, one or more embodiments include determining, by a mobile device, a hospitality preference of a user of the mobile device for a particular location, storing the hospitality preference in a memory of the mobile device, and modifying, by the mobile device, an operation of at least one system device associated with the particular location to provide the hospitality preference responsive to a distance between the mobile device and the particular location exceeding a particular threshold.

Providing hospitality in accordance with one or more embodiments of the present disclosure can include providing comfort, meeting needs and/or desires (e.g., shelter, food, water, etc.), relaxation, ease of use, streamlined travel, entertainment, and/or information. In general, providing hospitality can include ensuring that a user is satisfied with a particular experience (e.g., travel, lodging, etc.). Hospitality entities such as hotels, motels, travel agencies, universities, office buildings, stadiums, service companies (e.g., taxicab companies), airports, and/or train stations, for instance, can provide hospitality via one or more embodiments of the present disclosure.

Providing hospitality can include providing a way for users to interact with devices designed to provide hospitality (e.g., one or more measures of hospitality). Such devices may be system devices. As referred to herein, "system devices" include "smart" devices, devices of a Building Management System (BMS), and/or devices capable of joining a system or network. For example, system devices can include sensors, controllers, actuators, gateways, lights, heating, ventilation and air conditioning (HVAC) system devices, water system devices, alarms, security devices, thermostats, shading devices, communication devices, appliances, etc.

In some embodiments in accordance with the present disclosure, providing hospitality can include allowing a device associated with a user to interact with (e.g., modify one or more operations of) system devices rather than the user having to personally (e.g., physically) interact with the system devices. Devices associated with a user, or mobile devices, as referred to herein, include devices that are (or can be) carried and/or worn by the user. That is, providing hospitality in accordance with one or more embodiments of the present disclosure can be implemented by the use of a carried and/or worn mobile device, such as a smart phone or wristband (e.g., watch). Accordingly, embodiments of the present disclosure can be fully automated and implemented without any burden or change in behavior of the user.

A person may have personal preferences associated with hospitality. Those preferences are referred to herein as "hospitality preferences" and can include preferences associated with aspects of hospitality such as, for example, temperature, humidity, transportation, interaction with hospitality entities, timing, activities, the provision of information, and other preferences.

Hospitality preferences may depend, for instance, on location. For example, a person may prefer a temperature to be set to 69 degrees Fahrenheit if they are in a living room (e.g., watching television) or 73 degrees Fahrenheit if they are in a bathroom (e.g., exiting a shower). In some embodiments, wireless connection(s) can be established between the user's mobile device and various system devices. In some embodiments, wireless connection(s) can be established between the user's mobile device and location beacons dispersed throughout the structure in order to determine the device's location within the structure. In other embodiments, the device's location can be determined using other location functionality (e.g., WiFi, GPS, etc.), for instance.

Preferences may also depend on time context (e.g., a time of day, a day of week, a time of year, etc.). For example, a person may prefer different lighting conditions inside during summer months in the afternoon than in winter months.

Embodiments of the present disclosure can determine these preferences, store them in memory, and use them to provide hospitality. In some embodiments, the preferences can be determined based on tracking (e.g., learning) behavior of the user over a period of time. Tracking can include tracking user (e.g., device) location in conjunction with user interaction(s) with system devices. Additionally, preferences can be determined directly through user input (e.g., into the mobile device and/or into one or more system devices).

Providing hospitality can include modifying (e.g., changing) an operation, state, and/or mode of a system device. For example, modification can include activating or deactivating a device, adjusting a device, alternating between device modes, etc. Accordingly, personalized interactions with system devices can be made by the mobile device specifically tailored to the hospitality preferences of the user of the mobile device.

Embodiments of the present disclosure can store preferences associated with a plurality of users. It is to be understood that each user may find hospitality with a unique set of settings and thus may have unique preferences. In instances where multiple users may share a location, embodiments of the present disclosure can allow for hybridizing (e.g., compromising) their comfort settings and/or prioritizing one user's comfort over another.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

FIG. 1 illustrates a system 100 for providing hospitality via mobile device 102 in accordance with one or more embodiments of the present disclosure. As shown in FIG. 1, system 100 includes a mobile device 102, an Application Program Interface (API) 104, and a hospitality entity 108. The mobile device 102 can be a phone (e.g., a smart phone), a tablet, a personal digital assistant (PDA), and/or a wrist-worn device, among other types of computing devices.

As shown in FIG. 1, mobile device 102 includes a memory 108 and a processor 112 coupled to memory 108. The processor 112 can be a controller (e.g., a micro controller) in some embodiments. Memory 108 can be any type of storage medium that can be accessed by processor 112 to perform various examples of the present disclosure. For example, memory 108 can be a non-transitory computer readable medium having computer readable instructions (e.g., computer program instructions) stored thereon that are executable by processor 112 to provide hospitality in accordance with one or more embodiments of the present disclosure. The computer readable instructions can be and/or be a portion of an application 110 (e.g., a mobile application) which may be downloadable over the internet, for instance.

Memory 108 can be volatile or nonvolatile memory. Memory 108 can also be removable (e.g., portable) memory, or non-removable (e.g., internal) memory. For example, memory 108 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 108 is illustrated as being located in mobile device 102, embodiments of the present disclosure are not so limited. For example, memory 108 can also be located internal to another computing resource (e.g., enabling computer readable instructions to be downloaded over the Internet or another wired or wireless connection).

The memory 108 can include one or more hospitality preferences. Hospitality preferences can include preferences of the user associated with being provided hospitality. For example, hospitality preferences can be and/or include settings (e.g., temperature settings), comfort preferences (e.g., humidity preferences), abilities (e.g., options to be provided associated with adjusting device(s)), controls (e.g., methods of adjusting preferences), and/or information (e.g., information associated with an entity, a location of an entity, and event in the entity, etc.), among others. Some hospitality preferences may be specific to a particular device; some hospitality preferences may pertain to a plurality of devices. For example, preferences associated with an access reader may be specific to that access reader, whereas preferences associated with lighting may involve a plurality of lighting devices.

As shown in FIG. 1, mobile device 102 includes a user interface 113. A user of mobile device 102 can interact with mobile device 102 via the user interface 113. For example, user interface 113 can provide (e.g., display and/or present) information to the user of mobile device 102, and/or receive information from (e.g., input by) the user of mobile device 102. For instance, in some embodiments, user interface 113 can be a graphical user interface (GUI) that can include a display (e.g., a screen) that can provide and/or receive information to and/or from the user of mobile device 102. The display can be, for instance, a touch-screen (e.g., the GUI can include touch-screen capabilities). As an additional example, user interface 113 can include a keyboard and/or mouse the user can use to input information into computing device 102. Embodiments of the present disclosure, however, are not limited to a particular type(s) of user interface.

The hospitality entity 106 (sometimes generally referred to herein as "entity 106") can be a hotel, motel, travel agency, university, office building, stadium, service company (e.g., taxicab company), airport, and/or train station, for instance, among others. Although one entity is shown, embodiments of the present disclosure can include a plurality of entities.

The entity 106 can include a system device 114. As previously discussed, system device 114 can be a "smart" device, a device of a Building Management System associated with the entity 106 and/or a device capable of joining a system or network, for instance. System devices can include sensors, controllers, lights, heating, ventilation and air conditioning (HVAC) system devices, water system devices, alarms, security devices, thermostats, shading devices, communication devices, appliances, etc. Although the system device 114 is shown as being in the entity 106, embodiments of the present disclosure are not so limited. Further, although one system device is shown, embodiments of the present disclosure can include a plurality of system devices.

The mobile device 102 can establish a wireless connection with the system device 114 (and/or the entity 106) via the API 104. The API 104 can be a set of routines, protocols, and/or tools specifying how the mobile device 102 (e.g., the application 110 of the mobile device 102) can interact with the hospitality entity 106 and/or the system device 114. The API may be located remote from the mobile device 102 and/or the entity 106 and may be accessed via a wireless connection, for instance. In some embodiments, the mobile device 102 can communicate directly with the system device 114 (e.g., without the use of the API 104).

In some embodiments, the mobile device 102 can establish a wireless connection with the entity 106 (e.g., portions of the entity 106). For example, the entity 106 can include one or more location beacons. The location beacons can be transmitters configured to wirelessly connect with the mobile device 102 such as Bluetooth low energy (BLE) beacons, for instance, though embodiments of the present disclosure are not so limited. For instance, the location beacons can be WiFi beacons and/or femtocells, among other beacons. The location beacons can be coin cell devices, USB sticks, dongles, and/or other form factors. The location beacons can be a portion of an indoor proximity system, for instance. Each of the location beacons can be located at a respective location (e.g., position) in the entity 106.

The location beacons can allow mobile device to determine its location (e.g., position) within the entity. In some embodiments, the location beacons can be used to determine a particular room of the entity 106 the mobile device 102 is in based on a wireless connection between the mobile device 102 and at least one location beacon within the entity. Where "room" is used in examples discussed herein, it is to be understood that other areas are included. For example, a user can define a custom polygon in the entity and the location beacons can determine when a user has entered the polygon.

For example, location beacons can each transmit a universally unique identifier recognized by the mobile device 102. When the mobile device 102 receives a transmission from one or more of location beacons, it can determine the distance from the location beacon(s). In some embodiments, the mobile device 102 can triangulate, trilaterate and/or multilaterate its location using a plurality of the location beacons. The mobile device 102 can determine when a user associated with (e.g., carrying) the mobile device has entered, exited, or lingered in a location (e.g., a room of the entity 106).

In some embodiments, other means of determining a location of the mobile device 102 can be utilized in lieu of, or in addition to, the use of location beacons. For example, the location can be determined using location functionalities utilizing WiFi signals, GPS satellites, cellular towers, and/or others.

In some embodiments, the mobile device 102 can establish a wireless connection with a network associated with (or accessible by) the entity 106. For example, the user can, via the wireless connection to the internet, check in to his hotel room using the mobile device 102 from the airport at which he just landed. In a similar fashion, the user can pay for hotel services and/or check out of the hotel via the wireless connection.

As previously discussed, embodiments of the present disclosure can track movements of the mobile device 102 (and by extension, movements and preferences of the user associated with mobile device 102) throughout the entity 106. In order to determine and/or learn hospitality preferences (e.g., one or more settings of system device 114) some embodiments can correlate user interactions with system device 114 with determined locations and/or movements as well as their time(s) (e.g., time context(s)) to determine hospitality preferences.

In an example, it can be determined that the user typically turns the bathroom lights off in his hotel room when he leaves it on weeknights after 9:00 pm. Such tracking can be carried out over a plurality of system devices over a period of time (e.g., a day, a week, a month, a season, a year, etc.).

In some embodiments the user can input and/or select, via the mobile device 102, a hospitality preference. Such an input and/or selection can be responsive to the establishment of a wireless connection between the mobile device 102 and the system device 114. In some embodiments, exceeding the particular threshold can include the user's distance from one or more location beacons and/or system device 114 exceeding a particular threshold.

In other embodiments, exceeding such a threshold can include the user entering a room and/or zone associated with a particular location beacon (e.g., location beacon) and/or coming within a particular distance of the location beacon.

In some embodiments, exceeding the threshold can include the user coming within a particular distance of the entity 106. Coming within a particular instance can include the user entering a particular region and/or bounded geometry, for instance. In an example, the user exceeds the threshold distance upon arriving in the city of the entity 106.

In some embodiments, preferences can be determined based on time. In one example, the user can define a hospitality preference for "wake up time" (e.g., between 6:00 am and 7:00 am) where the preference includes the lights being turned off, ventilation being on, temperature at 80 degrees Fahrenheit, and security system disarmed. In another example, the user can define a hospitality preference such that the user is to receive information (e.g., directions) and/or event tickets at a predetermined time before the event is to start.

Additionally, hospitality preferences can be determined based on local weather conditions affecting the entity 106. Accordingly, embodiments of the present disclosure can be in communication with various weather services and/or sources of local weather conditions. In an example, a hospitality preference associated with a period of inclement weather and/or cloud cover (e.g., blinds open) may differ from another hospitality preference associated with a sunny day (e.g., blinds closed).

Once determined, hospitality preferences can be stored in the memory 108 for subsequent access and/or retrieval. The hospitality preferences can be stored in association with the user and/or the mobile device 102 (e.g., via a device identifier). Embodiments of the present disclosure can retrieve a particular hospitality preference and provide the hospitality preference when the user is in a particular location in the entity 106 and/or at a particular time. That is, embodiments can access a predefined hospitality preference stored in the memory 108. Some embodiments can run as a background service on the mobile device 102 and can establish a wireless connection between the mobile device 102 device and the system device 114.

To provide hospitality preferences, embodiments of the present disclosure can modify an operation of the system device 114. In other words, embodiments can change a state of the system device 114 from a first state to a second state. For example, modification can include activating or deactivating the system device 114, adjusting (e.g., adjusting power, output, speed, etc.) the system device 114, alternating between modes (e.g., states), such as energy efficiency mode (e.g., off) and/or comfort mode (e.g., on) of the system devices 114, etc.

As previously discussed, the system device 114 can be a controller. The controller can include logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The controller can be and/or include a computing device configured to execute instructions instead of, or in addition to, logic. The controller can cause the modification(s) of various system devices (e.g., system device 114). The controller can exchange information directly with the mobile device 102. In some embodiments, the controller and the mobile device 102 can exchange information via one or more intermediary devices (e.g., a thermostat).

That is, the controller can (e.g., can include logic to) cause a modification of an operation of a first system device of a hospitality entity responsive to a determination that a mobile device is located at a first location with respect to the hospitality entity, and cause a modification of an operation of a second system device of the hospitality entity responsive to a determination that the mobile device is located at a second location with respect to the hospitality entity, and communicate hospitality information associated with the hospitality entity to the mobile device.

The alternation between an energy efficient mode and a comfort mode can be carried out responsive to occupancy determinations within the entity 106 (or a particular portion of the entity), for instance. In an example, when no occupants are detected within a particular room of the entity 106, embodiments of the present disclosure can default system device 114 to an energy efficiency mode and switch to a comfort mode when occupancy is detected (e.g., a user enters).

Such modification can be responsive to a distance between the mobile device and the particular location exceeding a particular threshold (as previously discussed). In one example, an electronic door lock can actuate and/or unlock responsive to the user drawing near the door while carrying the mobile device 102.

Additionally, such modification can be responsive to a particular time (e.g., time of day, day of week, month, season, etc.). In some embodiments, the user may be prompted, via the mobile device 102, for permission to modify an operation of the system device 114. An example of such a prompt may include the text "would you like to activate the air conditioning?" and a way to indicate "yes" or "no."

As previously discussed, the entity 106 can include system devices in addition to the system device 114. In an example, the entity 106 includes a first system device (e.g., system device 114) and a second system device (not illustrated in FIG. 1). Although two system devices are discussed in this example, embodiments of the present disclosure can include more or fewer system devices. As previously discussed, system devices can include "smart" devices, devices of a Building Management System associated with the entity 106 and/or devices capable of joining a system or network. For example, system devices can include sensors, controllers, lights, heating, ventilation and air conditioning (HVAC) system devices, water system devices, alarms, security devices, thermostats, shading devices, communication devices, appliances, etc.

For the purposes of illustration, the first system device of the example is discussed as being located in a first area (e.g., room) of the entity 106 and the second system device of the example is located in a second area (e.g., room) of the entity 106. It is to be understood that embodiments of the present disclosure are not limited to such a scenario.

Some embodiments in accordance with the present disclosure can cause a modification of an operation of the first system device (e.g., system device 114) of the hospitality entity 106 responsive to a determination that the mobile device 102 is located at a first location with respect to the hospitality entity 106, and then cause a modification of an operation of a second system device (e.g., the other system device (not shown)) of the hospitality entity 106 responsive to a determination that the mobile device 102 is located at a second location with respect to the hospitality entity 106.

For example, upon a determination that the mobile device 102 is at a first location and/or has established a wireless connection with an access reader (the first system device of the example), the access reader's operation can be modified such that it allows access to the mobile device 102 (provided the mobile device 102 has been granted permission for access). Upon a determination that the mobile device 102 is at a second location and/or has established a wireless connection with a thermostat (the second system device of the example), the thermostat's operation can be modified such that it provides a temperature setting in accordance with a hospitality preference associated with the user.

The modifications of the operations of the first and second system devices can be responsive to the establishment of wireless connections between the mobile device and the first and/or second system devices, as previously discussed, though embodiments of the present disclosure are not so limited. In some embodiments, the modifications of the operations can be responsive to time(s) of day. In other embodiments, the modifications can be responsive to plans and/or an itinerary of the user. Such an itinerary can be input by the user into the mobile device 102, for instance, and can be associated with hospitality preferences.

By combining user preference(s), schedule(s), reservation(s), and/or time information, embodiments of the present disclosure can "anticipate" user needs and realize them proactively. This realization can be carried out in an automated manner, for instance, (e.g., without user input) or responsive to one or more user inputs into the mobile device 102.

For example, if the user can indicate to the mobile device 102 that he is planning to land in New York City, take a taxi to his hotel, check into his hotel, then attend a stage production in the city that evening, embodiments of the present disclosure can modify operations of various system devices in order to streamline the user's experience according to the user's preferences. In one example, a taxi can be summoned by the mobile device 102 such that it will be waiting for the user when he exits the terminal. Heating and/or cooling systems of the taxi can be modified such that the user is provided an environment that matches his preferences. A check-in menu can be displayed to the user via the mobile device 102 in which the user can check in to the hotel and/or select a room without having to wait in line. In some embodiments, check-in can be carried out in the absence of user input (e.g., the user has set a hospitality preference that he would like an available room nearest an elevator).

Continuing in the example, the user can be provided with available tickets to stage productions occurring that evening and can order and receive a ticket via the mobile device 102. In some embodiments, hospitality information associated with the hospitality entity can be displayed by the mobile device 102. Such information can include a map corresponding to a location of the hospitality entity. In some embodiments, a man can include a map of the city and/or a map of the hospitality entity (e.g., a floor plan). A map may include points of interest to the user based on the user's hospitality preferences. For instance, the man can include restaurants that match the user's preferences, tastes, allergic restrictions, etc.

Thus, the user can be provided with relevant information without having to search for it. When the user reaches his hotel, he can proceed to his room and enter because embodiments of the present disclosure have provided him access to the room via the mobile device 102. Upon checking in and/or entering the room, the temperature of the room can be modified in accordance with the user's preferences. Further, another taxi ride may be scheduled (e.g., without user input) to take the user to the stage production for which he has already purchased tickets via the mobile device 102.

In some embodiments, once determined and/or stored in memory, hospitality preferences can be utilized for other purposes. For example, some embodiments may provide a recommendation associated with increasing efficient usage of energy in the entity 106 (e.g., reducing energy usage) by modifying a hospitality preference (e.g., increasing a temperature set point of a thermostat by one degree during the summer). The recommendation can include a potential monetary savings resulting from the modification. Accordingly, mobile devices in accordance with embodiments of the present disclosure can be in communication with various power providers and/or sources of local power cost information. In some instances, users can be provided with incentives to modify their preferences such that energy usage of the entity 106 is reduced.

Hospitality preferences stored in the memory can be accessed and/or retrieved by a plurality of hospitality entities and/or system devices of a plurality of hospitality entities. In an example, a user determines a hospitality preference associated with a temperature in a hotel room. Embodiments of the present disclosure can retrieve and provide that comfort preference in the event that the user stays in a different hotel (e.g., a different branch of a hotel chain). Accordingly, the user's comfort may be automatically maintained across various entities according to his preferences. The user may be able to allow certain entities and/or system devices to access his or her hospitality preferences via the mobile device 102.

Figure 2:
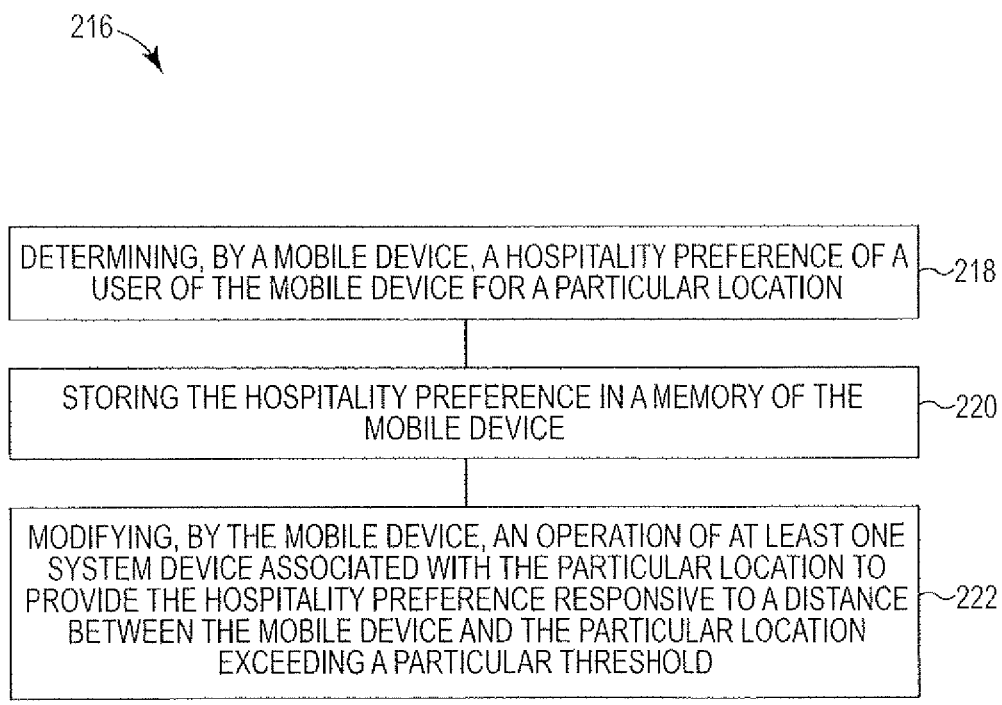
FIG. 2 illustrates a method for providing hospitality via a mobile device in accordance with one or more embodiments of the present disclosure.

FIG. 2 illustrates a method 216 for providing hospitality via a mobile device in accordance with one or more embodiments of the present disclosure. Method 216 can be performed, for example, by a computing device, such as mobile device 102 previously described herein (e.g., in connection with FIG. 1).

At block 218, method 216 includes determining a hospitality preference of a user of a mobile device for a particular location. As previously discussed, hospitality preferences can be "learned" over a period of time and/or input by a user. The particular location can refer to a particular system device and/or structure at the location, and/or a particular location with respect to a hospitality entity. In some embodiments, method 216 can include determining the hospitality preference based on at least one adjustment made to the at least one device over a particular period of time.

At block 220, method 216 includes storing the hospitality preference in a memory. The hospitality preference can be stored in a memory (e.g., memory 108, previously described in connection with FIG. 1) for later retrieval, for instance.

At block 222, method 216 includes modifying an operation of at least one system device associated with the particular location to provide the hospitality preference responsive to a distance between the mobile device and the particular location exceeding a particular threshold. In some embodiments, the distance between the mobile device and the particular location can be determined using a location functionality associated with the mobile device. Exceeding the particular threshold can include the mobile device being determined to be located in a particular room of a particular structure. Exceeding the particular threshold can include the mobile device being determined to be within a particular distance from the structure.

In some embodiments, the mobile device can display the hospitality preference being provided (e.g., a temperature to which a room is being adjusted). In some embodiments, the mobile device can communicate with various system devices and determine a status of the provision of the hospitality preference. For instance, the mobile device can determine and/or display an expected time until the hospitality preference is provided (e.g., fully provided).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A device for providing hospitality, comprising:
    a memory; and
    a processor configured to execute executable instructions stored on the memory to:
        cause a modification of an operation of a heating, ventilation, and air conditioning system device of a hospitality entity according to a first hospitality preference of a user responsive to a determination that a mobile device is located at a first location with respect to the hospitality entity, wherein the first hospitality preference is determined based on at least one temperature adjustment made to the heating, ventilation, and air conditioning system device over a particular period of time;
        cause a modification of an operation of an access reader configured to allow physical access to a room of the hospitality entity according to a second hospitality preference of the user responsive to an establishment of a wireless connection between the mobile device and the access reader;
        cause a different modification of the operation of the heating, ventilation, and air conditioning system device of the hospitality entity according to a compromise between the first hospitality preference of the user and a hospitality preference of a different user responsive to the determination that the mobile device is located at the first location with respect to the hospitality entity and a determination that a different mobile device associated with the different user is also located at the first location with respect to the hospitality entity; and
        communicate hospitality information associated with the hospitality entity to the mobile device.

2. The device of claim 1, wherein the instructions are executable by the processor to allow the user to communicate with the hospitality entity via at least one input made using the mobile device.

3. The device of claim 1, wherein the hospitality entity is one of a hotel, a motel, a travel agency, a university, an office building, a stadium, a service company, an airport, and a train station.

4. The device of claim 1, wherein the hospitality information associated with the hospitality entity includes a map corresponding to a location of the hospitality entity.

5. A method for providing hospitality via a mobile device, comprising:
   determining, by a first mobile device, a first hospitality preference of a first user of the first mobile device for a particular location based on at least one temperature adjustment made to a heating, ventilation, and air conditioning system device over a particular period of time;
   determining, by a second mobile device, a second hospitality preference of a second user of the second mobile device for the particular location;
   storing the first hospitality preference in a memory of the first mobile device;
   storing the second hospitality preference in a memory of the second mobile device;
   determining, by the first mobile device, an additional hospitality preference of the first user of the mobile device for an access reader configured to allow physical access to a room of the hospitality entity;
   modifying an operation of the heating, ventilation, and air conditioning system device associated with the particular location to provide a compromise between the first hospitality preference of the first user and the second hospitality preference of the second user responsive to a distance between the first mobile device and the particular location exceeding a particular threshold and a distance between the second mobile device and the particular location exceeding the particular threshold; and
   modifying, by the first mobile device, an operation of the access reader to provide the additional hospitality preference responsive to an establishment of a wireless connection between the first mobile device and the access reader.

6. The method of claim 5, wherein determining the first hospitality preference and the additional hospitality preference of the first user includes allowing the first user to input the hospitality preferences into the first mobile device.

7. The method of claim 5, wherein determining the first hospitality preference of the first user for the particular location includes determining a hospitality preference of the first user for a particular structure.

8. The method of claim 7, wherein the distance between the first mobile device and the particular location exceeding the particular threshold and the distance between the second mobile device and the particular location exceeding the particular threshold includes the respective mobile devices being determined to be located in a particular room of the particular structure.

9. The method of claim 7, wherein the distance between the first mobile device and the particular location exceeding the particular threshold and the distance between the second mobile device and the particular location exceeding the particular threshold includes the respective mobile devices being determined to be within a particular distance from the structure.

10. The method of claim 5, wherein the method includes determining the distance between the first mobile device and the particular location, and the distance between the second mobile device and the particular location using a respective location functionality associated with the respective mobile devices.

11. The method of claim 5, wherein the method includes determining, by the first mobile device, a status of the provision of the first or the second hospitality preference.

12. The method of claim 5, wherein modifying an operation of the heating, ventilation, and air conditioning system device includes the mobile device communicating with the heating, ventilation, and air conditioning system device via a particular application programming interface.

13. A non-transitory computer-readable medium having computer readable instructions stored thereon that are executable by a processor to:
   establish a communication between a mobile device and a heating, ventilation, and air conditioning first system device of a hospitality entity via a particular application program interface (API);
   access a first predefined user preference associated with the heating, ventilation, and air conditioning system device, wherein the first predefined user preference is determined based on at least one temperature adjustment made to the heating, ventilation, and air conditioning system device over a particular period of time;
   cause the heating, ventilation, and air conditioning system device to change from a first state to a second state via the API according to the first predefined user preference;
   establish a wireless connection between the mobile device and an access reader configured to allow physical access to a room of the hospitality entity via the API;
   access a second predefined user preference associated with the access reader;
   cause the access reader to change state via the API according to the second predefined user preference responsive to the establishment of the wireless connection between the mobile device and the access reader;
   establish a different communication between a different mobile device and the heating, ventilation, and air conditioning system device via the particular API, wherein the different mobile device is associated with a different user; and
   cause the heating, ventilation, and air conditioning system device to change from the second state to a third state via the API according to a compromise between the first predefined user preference of the user and a different predefined user preference of the different user.

14. The computer-readable medium of claim 13, wherein the instructions are executable by the processor to cause the heating, ventilation, and air conditioning system device to change from the first state to the second state via the API according to the predefined user preference without a user input to the mobile device.

15. The computer readable medium of claim 13, wherein the instructions are executable by the processor to cause the heating, ventilation, and air conditioning system device to change from the first state to the second state via the API responsive to the establishment of the communication.

16. The computer readable medium of claim 13, wherein the instructions are executable by the processor to cause the heating, ventilation, and air conditioning system device to change from the first state to the second state via the API responsive to a user input to the mobile device.

17. The computer readable medium of claim 13, wherein the first state is a comfort mode and the second state is an energy efficiency mode.

\* \* \* \* \*